United States Patent
Fallon et al.

(10) Patent No.: US 9,506,575 B2
(45) Date of Patent: Nov. 29, 2016

(54) CHECK VALVE DISC

(71) Applicant: Mueller International, LLC, Atlanta, GA (US)

(72) Inventors: Timothy Q. Fallon, Geneva, IL (US); George Robert Charles Bainbridge, Sandwich, IL (US)

(73) Assignee: Mueller International, LLC, Atlanta, GA (US)

( * ) Notice: Subject to any disclaimer, the term of this patent is extended or adjusted under 35 U.S.C. 154(b) by 215 days.

(21) Appl. No.: 14/326,610

(22) Filed: Jul. 9, 2014

(65) Prior Publication Data

US 2016/0010756 A1 Jan. 14, 2016

(51) Int. Cl.
*F16K 15/03* (2006.01)
*F16K 27/02* (2006.01)

(52) U.S. Cl.
CPC .......... *F16K 15/03* (2013.01); *F16K 27/0227* (2013.01)

(58) Field of Classification Search
CPC ...... F16K 15/00; F16K 15/03; F16K 15/031; F16K 15/14
USPC ............... 137/856, 527, 527.2, 527.4, 527.8; 251/298
See application file for complete search history.

(56) References Cited

U.S. PATENT DOCUMENTS

| | | | |
|---|---|---|---|
| 291,773 A | 1/1884 | Reilly | |
| 349,549 A | 9/1886 | West | |
| 673,674 A * | 5/1901 | Baker | E03B 9/16 137/300 |
| 935,412 A | 9/1909 | Rust | |
| 1,070,667 A | 8/1913 | Clark | |
| 1,720,444 A * | 7/1929 | Rowley | F16K 15/03 137/527.8 |
| 1,960,472 A | 5/1934 | Balaam et al. | |
| 2,629,448 A * | 2/1953 | Duggan | G05D 11/003 137/111 |
| 3,292,658 A * | 12/1966 | Scaramucci | F16K 15/144 137/527.2 |
| 3,295,547 A * | 1/1967 | Scaramucci | F16K 15/144 137/315.33 |

(Continued)

FOREIGN PATENT DOCUMENTS

CA 2635547 3/2013

OTHER PUBLICATIONS

Val-Matic, Swing-Flex Check Valves Brochure, May 2013.*

(Continued)

*Primary Examiner* — Craig Schneider
*Assistant Examiner* — Daniel P Donegan
(74) *Attorney, Agent, or Firm* — Taylor English Duma LLP (57) ABSTRACT

Disclosed is a check valve disc including a disc flapper, the disc flapper formed with urethane, a flexing portion formed by the disc flapper, and a rigid portion including a sealing surface. Also disclosed is a check valve including a valve body, the valve body having an inlet end, an outlet end, and an inner surface defining an inlet cavity proximate the inlet end and an outlet cavity proximate the outlet end, and a check valve disc, the check valve disc including a disc flapper, the disc flapper formed with urethane.

20 Claims, 6 Drawing Sheets

(56) References Cited

U.S. PATENT DOCUMENTS

| | | | |
|---|---|---|---|
| 3,539,150 A * | 11/1970 | Conrad | F16K 1/2028 137/856 |
| 4,139,931 A | 2/1979 | Royce | |
| 4,191,205 A * | 3/1980 | Nash | F16K 15/03 137/375 |
| 4,227,544 A | 10/1980 | Luckenbill | |
| 4,469,122 A | 9/1984 | Meek | |
| 4,477,051 A * | 10/1984 | Ben-Yehuda | F16K 31/402 251/298 |
| 4,602,654 A | 7/1986 | Stehling et al. | |
| 4,691,726 A | 9/1987 | Studer et al. | |
| 5,159,953 A | 11/1992 | Sato et al. | |
| 5,285,816 A * | 2/1994 | Herlihy | F16K 15/03 137/527.8 |
| 5,355,910 A * | 10/1994 | Gies | B60H 1/249 137/855 |
| 5,813,572 A | 9/1998 | Kolacek | |
| 6,000,473 A | 12/1999 | Reilly | |
| 6,019,398 A | 2/2000 | Powers | |
| 6,050,294 A * | 4/2000 | Makowan | E03B 7/077 137/527 |
| 6,152,173 A * | 11/2000 | Makowan | F16K 15/03 137/527 |
| 6,227,234 B1 | 5/2001 | Powers | |
| 6,247,489 B1 | 6/2001 | Maskell et al. | |
| 6,360,771 B2 | 3/2002 | Powers | |
| 6,543,474 B2 | 4/2003 | Fetterman | |
| 6,691,732 B2 | 2/2004 | Fleury et al. | |
| 6,782,916 B2 | 8/2004 | Svendsen et al. | |
| 6,868,860 B2 | 3/2005 | Davidson | |
| 6,886,586 B2 | 5/2005 | Fleury | |
| 6,892,752 B2 | 5/2005 | Burlock et al. | |
| 7,004,511 B2 | 2/2006 | Barron et al. | |
| 7,055,544 B2 | 6/2006 | Davidson | |
| 7,104,572 B1 | 9/2006 | Kane | |
| 7,128,091 B2 | 10/2006 | Istre | |
| 7,174,911 B2 | 2/2007 | Davidson | |
| 7,191,666 B2 | 3/2007 | Parris et al. | |
| 7,490,868 B2 | 2/2009 | Prestridge | |
| 7,520,294 B2 * | 4/2009 | German | E03B 9/16 137/300 |
| 7,533,693 B2 * | 5/2009 | Colton, Jr. | F16K 15/031 116/277 |
| 7,686,031 B2 * | 3/2010 | German | E03B 9/16 137/300 |
| 7,784,489 B2 * | 8/2010 | Paulin | F04D 9/008 137/527.2 |
| 8,733,381 B2 * | 5/2014 | Peyton | E03B 9/16 137/15.02 |
| 2003/0121846 A1 | 7/2003 | Use et al. | |
| 2005/0155645 A1 | 7/2005 | Freudendahl | |
| 2006/0016479 A1 | 1/2006 | Gonzales | |
| 2007/0295406 A1 * | 12/2007 | German | E03B 9/16 137/300 |
| 2008/0083458 A1 | 4/2008 | Davidson et al. | |
| 2009/0071549 A1 * | 3/2009 | Denike | B64D 13/02 137/512.1 |
| 2010/0132806 A1 | 6/2010 | Burczynski | |
| 2010/0181767 A1 | 7/2010 | Kozal | |
| 2010/0313972 A1 * | 12/2010 | Paulin | F04D 9/008 137/527.2 |
| 2016/0010756 A1 * | 1/2016 | Fallon | F16K 15/03 137/12 |

OTHER PUBLICATIONS

Abouelleil; Ashraf; U.S. Patent Application entitled: Check Valve With Accelerated Closure having U.S. Appl. No. 14/994,741, filed Jan. 13, 2016, 26 pgs.

Val-Matic; Brochure for Surgebuster Check Valves, Copyright 2013, 8 pgs.

Peyton, Nicholaus J.; Applicant Interview Summary for U.S Appl. No. 14/259,887, filed Apr. 23, 2014, mailed Feb. 8, 2016, 3 pgs.

Peyton, Nicholaus J.; Final Office Action for U.S. Appl. No. 14/259,887, filed Apr. 23, 2014, mailed Jan. 27, 2016, 15 pgs.

Peyton, Nicholaus J.; Non-Final Office Action for U.S Appl. No. 14/259,887, filed Apr. 23, 2014, mailed Mar. 11, 2016, 18 pgs.

Peyton, Nicholaus J.; Final Office Action for U.S. Appl. No. 12/144,273, filed Jun. 23, 2008, mailed Nov. 30, 2011; 14 pages.

Peyton, Nicholaus J.; Final Office Action for U.S. Appl. No. 12/144,273, filed Jun. 23, 2008, mailed Oct. 28, 2013; 23 pgs.

Peyton, Nicholaus J.; Issue Notification for U.S. Appl. No. 12/144,273, filed Jun. 23, 2008, mailed May 7, 2014, 1 pg.

Peyton, Nicholaus J.; Non-Final Office Action for U.S. Appl. No. 12/144,273, filed Jun. 23, 2008, mailed Jun. 13, 2013; 18 pgs.

Peyton, Nicholaus J.; Non-Final Office Action for U.S. Appl. No. 12/144,273, filed Jun. 23, 2008; mailed Jul. 28, 2011; 17 pages.

Peyton, Nicholaus J.; Notice of Allowance for U.S. Appl. No. 12/144,273, filed Jun. 23, 2008, mailed Jan. 10, 2014, 5 pgs.

Peyton, Nicholaus J.; US Patent Application Entitled: Anchor Valve for Security, filed Jun. 23, 2008, having U.S. Appl. No. 12/144,273, 18 pages.

Menyhart, Steven A., Office Action for Application No. 2,635,547 from Canadian Intellectual Property Office, mailed Dec. 23, 2010, 4 pages.

Peyton, Nicholaus, J.; Office Action for Application No. 2,635,547 From Canadian Intellectual Property Office, mailed Jun. 11, 2012; 2 pgs.

Peyton, Nicholaus, J.; Office Action for Application No. 2,635,547 From Canadian Intellectual Property Office, mailed Sep. 8, 2011; 3 pgs.

Peyton, Nicholaus J.; Provisional Patent Application entitled: Anchor Valve for Security, filed Jun. 21, 2007, having U.S. Appl. No. 60/945,464, 20 pages.

Val-Matic; "Surgebuster Swing Check Valve, Val-Matic Specification", Jul. 5, 2013, 1 pg.

"Water, Sewer and Drain Fittings B-10: Ductile Iron Mechanical Joint Fittings", Edward J. Prescott, Inc., Jun. 1, 2001.

Peyton, Nicholaus J.; U.S. Patent Application entitled: Anchor Valve for Security, having U.S. Appl. No. 14/259,887, filed Apr. 23, 2014, 18 pgs.

Peyton, Nicholaus J.; Non-Final Office Action for U.S. Appl. No. 14/259,887, filed Apr. 23, 2014, mailed Sep. 29, 2015, 32 pgs.

Peyton, Nicholaus J.; Applicant-Initiated Interview Summary for U.S. Appl. No. 14/259,887, filed Apr. 23, 2014, mailed May 24, 2016, 3 pgs.

Peyton, Nicholaus J.; Non-Final Office Action for U.S. Appl. No. 14/259,887, filed Apr. 23, 2014, mailed May 10, 2016, 25 pgs.

Peyton, Nicholaus; Notice of Allowance for U.S. Appl. No. 14/259,887, filed Apr. 23, 2014, mailed Sep. 13, 2016, 11 pgs.

* cited by examiner

CHECK VALVE DISC

TECHNICAL FIELD

The present invention relates generally to valves and, in particular, to check valves for regulating fluid flow.

BACKGROUND

There are numerous applications for controlling fluid flow, such as within a municipal water supply network or a private system for moving a water or chemical product, and it is sometimes advantageous to control fluid flow "in line" with piping used to transport that fluid from one location to another. While it can be desirable for fluid flow to be reversible in some applications, in various fluid systems it is desirable to allow the fluid to flow in only one direction at least some of the time or under certain conditions in various situations, and in other various situations is it desirable to allow fluid flow in only one direction at all times.

A check valve is a valve for allowing fluid flow in only one direction through the check valve. A check valve allows flow in only one direction by preventing flow reversal, i.e., flow in a direction opposite to the desired direction. Some check valves include a valve body having an inlet and an outlet and with a disc mounted within the valve body. The disc is positioned such that the disc covers the path from the outlet to the inlet during flow reversal, closing the valve, but moves away from the path when fluid flows from the inlet to the outlet, opening the valve. In a fluid piping system containing a pump and a check valve downstream of the pump, there is typically a time delay between when the pump stops pushing the fluid and when the check valve is fully closed. It is possible for flow reversal to occur if the valve does not close quickly enough. During flow reversal, the disc can slam closed quickly, creating noise and vibration in the piping system and potentially damaging the disc over long periods of use. "Valve slam" is another term used to describe the situation where the disc on a check valve, often as a result of flow reversal, is allowed to "slam" against the valve seat against which it is designed to seal.

SUMMARY

Disclosed is a check valve disc including a disc flapper, the disc flapper formed with urethane, a flexing portion formed by the disc flapper, and a rigid portion including a sealing surface.

Also disclosed is a check valve including a valve body, the valve body having an inlet end, an outlet end, and an inner surface defining an inlet cavity proximate the inlet end and an outlet cavity proximate the outlet end, and a check valve disc, the check valve disc including a disc flapper, the disc flapper formed with urethane.

Also disclosed is a method of manufacturing a check valve, the method including forming a check valve disc having a disc flapper including urethane, and installing the check valve disc between an inlet and an outlet of a check valve body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a check valve disc and associated methods, systems, devices, and various apparatus. It would be understood by one of skill in the art that the disclosed system is described in but a few exemplary embodiments among many. No particular terminology or description should be considered limiting on the disclosure or the scope of any claims issuing therefrom.

Figure 1:
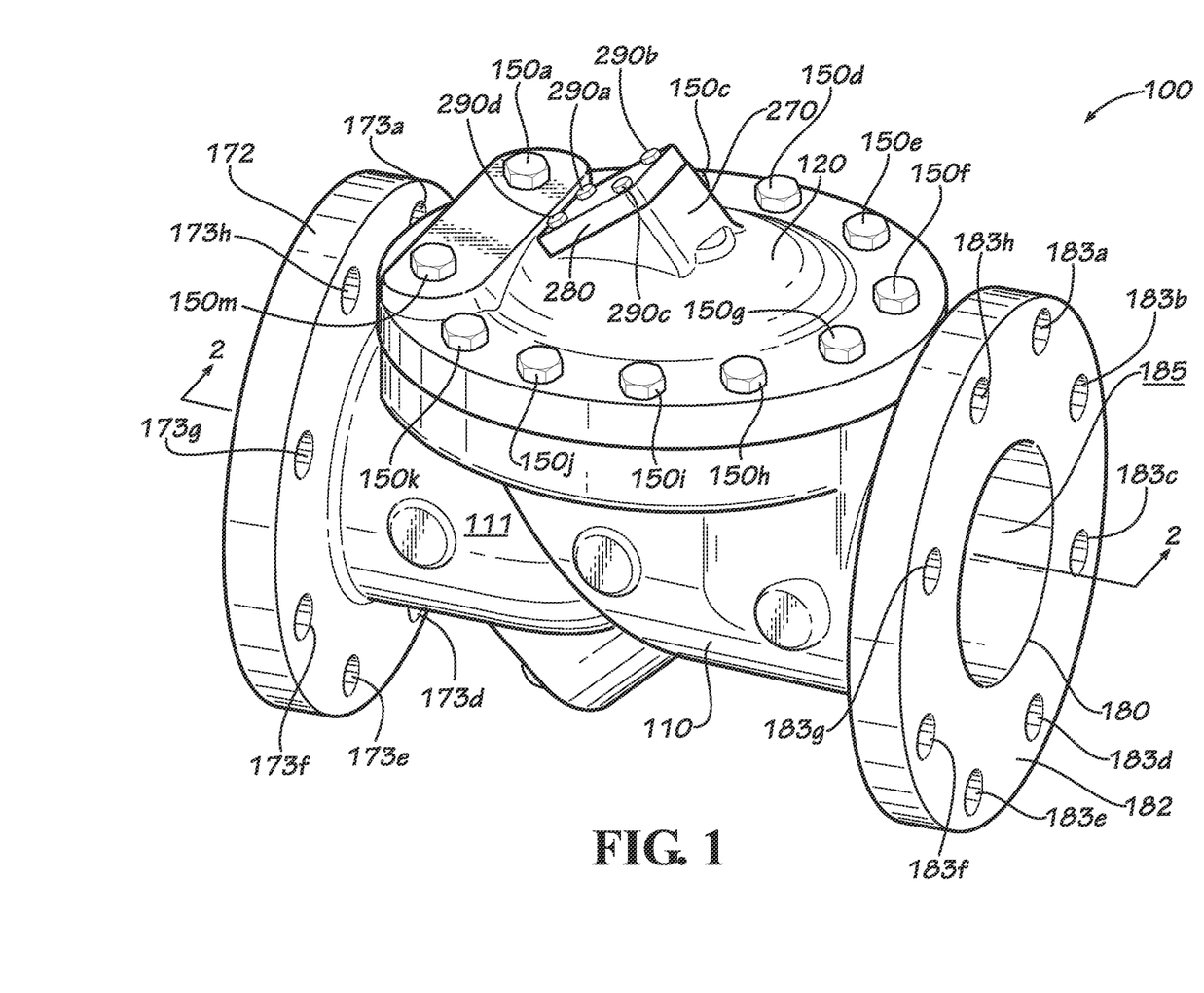
FIG. 1 is a perspective view of one embodiment of a check valve.

Disclosed in FIG. 1 is a perspective view of one embodiment of a check valve 100. In various embodiments, check valve 100 includes a valve body 110, a valve cover 120, and a check valve disc 200 (shown in FIG. 2). Valve body 110 includes an inlet 170 (shown in FIG. 2), an outlet 180, and an outer surface 111. Valve body 110 also includes an inlet flange 172 defining mounting hole bores 173a-h (173b,c not shown), and valve body 110 includes an outlet flange 182 defining mounting hole bores 183a-h.

Figure 2:
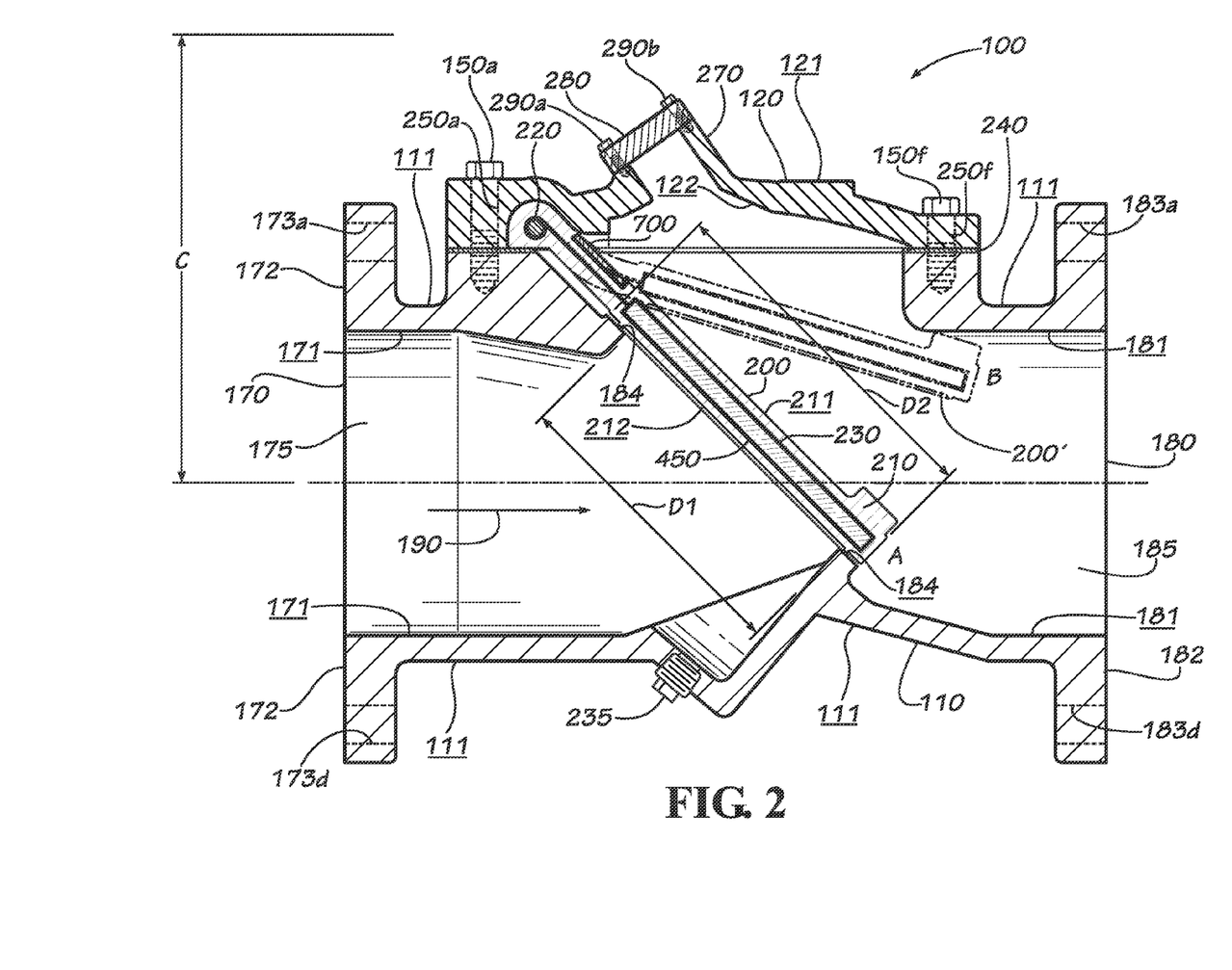
FIG. 2 is a sectional view of the check valve of FIG. 1 taken along lines 2-2 of FIG. 1.

Disclosed in FIG. 2 is a sectional view of the check valve 100 of FIG. 1 taken along lines 2-2 of FIG. 1. The valve body 110 includes an inlet inner surface 171 defining an inlet cavity 175, an outlet inner surface 181 defining an outlet cavity 185, and a disc sealing surface 184 against which check valve disc 200 is adapted to seal against. Flow of fluid through check valve 100 is shown by desired media flow path 190 which shows fluid going from inlet 170 to outlet 180 of check valve 100. In various embodiments, the inlet inner surface 171 and the outlet inner surface 181 are coated with an epoxy film. In various other embodiments, the inlet inner surface 171 and the outlet inner surface 181 are not coated with an epoxy film but rather have another material coating the surface or else the inlet inner surface 171 and the outlet inner surface 181 have no coating.

Valve cover 120 includes an outer surface 121, an inner surface 122, a boss 270, a boss cover 280 and a set of fasteners 290*a-d*. In various embodiments, valve cover 120 defines a plurality of mounting hole bores for mounting boss cover 280 with fasteners 290*a-d*. In various embodiments, valve cover 120 defines a plurality of mounting hole bores 250*a-m* (250*b-e* and 250*g-m* not shown) for mounting valve cover 120 to valve body 110 using a plurality of fasteners 150*a-m*. In various other embodiments, boss cover 280 may replaced with a mechanical position indicator (not shown) or other device to allow access to the interior of the check valve 100. In various embodiments, boss 270 and boss cover 280 are not present on the valve cover 120. In various embodiments, fasteners 150 and fasteners 290 are made from a steel such as SAE grade 5 zinc-plated steel. In various other embodiments, fasteners 150 and 290 are not made from steel but are made from another material including but not limited to other metals, metal alloys, or plastic. In various embodiments, the quantity, position, size and orientation of gasket 240, fasteners 150, or fasteners 290 varies from that shown in the current embodiment.

Check valve 100 also includes an access plug 235 in various embodiments so that the fluid inside the check valve 100 can be drained out or so that the inlet cavity 175 can be otherwise accessed. In various embodiments, valve body 110, valve cover 120, boss cover 280, and access plug 235 are made from ductile iron. In various other embodiments, valve body 110, valve cover 120, boss cover 280, or access plug 235 are not made from ductile iron but are made from another material or a combination of other materials including but not limited to copper, bronze, steel, or plastic (including fiber-reinforced plastic).

In various embodiments, gasket 240 is positioned between valve body 110 and valve cover 120 in order to facilitate a tight seal between valve body 110 and valve cover 120. In various embodiments, gasket 240 will define holes (not shown) to provide clearance for fasteners 150*a-m*. In various embodiments, gasket 240 may define holes that provide clearance for movement of parts of a valve position indicator (not shown), which in some embodiments will be mounted to boss 270 of valve cover 120. The valve position indicator will indicate the position of the check valve disc 200 of check valve 100—whether check valve 100 is open or closed or somewhere in between. In various embodiments, gasket 240 is made from a rubber such as Buna-N rubber. In various other embodiments, gasket 240 is not made from rubber but is made from another material or combination of materials with sealing properties including but not limited to EPDM or silicone.

For purposes of describing the present disclosure, check valve 100 will be in a closed position when check valve disc 200 is in contact with disc sealing surface 184. The position of check valve disc 200 when in contact with disc sealing surface 184 can also be described as position A. Conversely, check valve 100 will be in an open position when check valve disc 200 is not in contact with disc sealing surface 184. Moreover, when check valve disc 200 is in contact with outlet inner surface 181 of valve body 110, it can be said that check valve disc 210 is fully open. This open check valve position can also be described and is shown in FIG. 2 as position B.

An inside diameter D1 and an outside diameter D2 are shown defined by disc sealing surface 184 of valve body 110. Check valve disc 200 includes an outlet surface 211 and an inlet surface 212. In various embodiments, check valve disc 200 includes a hinge pin 220 and a stiffening insert 230 wrapped with a reinforcement strap 450 in some embodiments and encapsulated partially or completely by a disc flapper 210. In various other embodiments, check valve disc 200 will include only disc flapper 210 or will include disc flapper 210 with hinge pin 220 or stiffening insert 230 but not both hinge pin 220 and stiffening insert 230. In various embodiments, the inlet surface 212 makes a substantially fluid-tight seal with the disc sealing surface 184 of the check valve 100 when the check valve 100 is closed. In various embodiments, stiffening insert 230 and hinge pin 220 are made from a steel such as hot-rolled steel. In various other embodiments, stiffening insert 230 and hinge pin 220 are not made from steel but are made from another metal or polymeric material or combination of materials.

A clearance distance C, also shown in FIG. 2, is the minimum desired clearance between the centerline of check valve 100 and the housing or other enclosed space (not shown) in which the check valve 100 is installed in various embodiments. In various other embodiments, check valve 100 will not be installed inside a housing or other enclosed space. In some embodiments in which check valve 100 is installed inside a housing or other enclosed space, providing clearance distance C will ease repair or replacement or modification of check valve 100 by maintaining the proper clearance between that side of check valve 100 on which valve cover 120 is attached and any surrounding structure including. Clearance distance C will vary by model number of check valve 100 and other factors. In various embodiments, clearance distance C of the disclosed check valve 100 will typically range between 8.38" for a RD-SERIES check valve from Pratt with a 2" inside diameter to 32.75" for a RD-SERIES check valve from Pratt with a 24" inside diameter. In various embodiments, however, the value of clearance distance C will be outside of this range. In various embodiments, other model numbers and model names will be used to identify the check valve 100.

Figure 3:
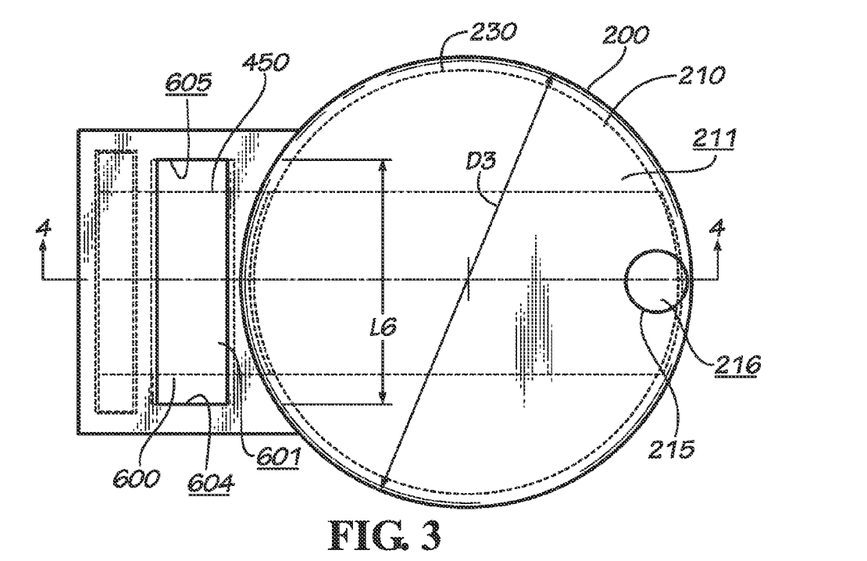
FIG. 3 is a top view of a first embodiment of a disc of the check valve of FIG. 1.

Disclosed in FIG. 3 is a top view of a first embodiment of the check valve disc 200. In various embodiments, check valve disc 200 includes the disc flapper 210, which encapsulates the stiffening insert 230. Check valve disc 200 includes outlet surface 211 and inlet surface 212. In various embodiments, check valve disc 200 also includes a stopper 215 and a stopper surface 216. In the current embodiment the stopper 215 and the stopper surface 216 are formed in the disc flapper 210. A bottom wall surface 601, a first side wall surface 602 (shown in FIG. 6), a second side wall surface 603 (shown in FIG. 6), a first end wall surface 604, and a second end wall surface 605 define a bending insert cavity 600 of the disc flapper 210 of the check valve disc 200. The bending insert cavity 600 has a length L6, a width W6, and a height H6. Bending insert cavity 600 is sized to receive a bending insert 700 (shown in FIG. 7). In various embodiments, both the bending insert cavity 600 and the bending insert 700 are substantially rectangular in shape. In various embodiments, check valve disc 200 need not include bending insert cavity 600 nor be assembled with bending insert 700, however, in order for check valve disc 200 and check valve 100 to function properly, and the presence of bending insert cavity 600 should not be considered limiting on the current disclosure.

Figure 4:
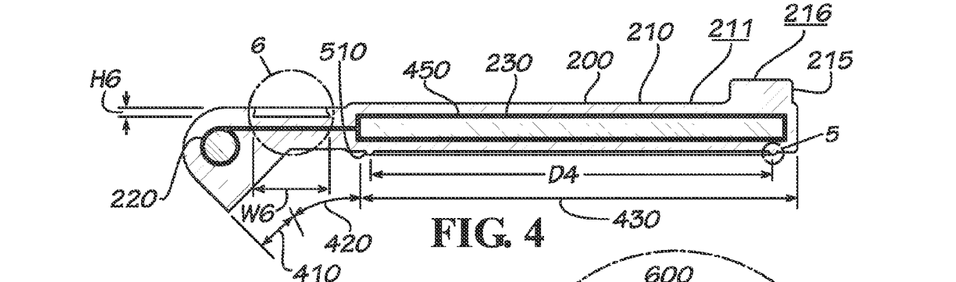
FIG. 4 is a sectional view of the check valve disc of FIG. 3 taken along lines 4-4 of FIG. 3.

Disclosed in FIG. 4 is a sectional view of the check valve disc of FIG. 3 taken along lines 4-4 of FIG. 3. The check valve disc 200 includes a hinge portion 410, a flexing portion 420, and a rigid portion 430. In various embodiments, hinge portion 410 will include hinge pin 220. In various embodiments, hinge pin 220 need not allow check valve disc 200 to rotate about hinge pin 220 in order to be considered a hinge. In various embodiments, hinge portion 410 of check valve disc 200 will be shaped so as to fill and remain stationary inside the space available between valve body 110 and valve cover 120. In the current embodiment, rigid portion 430 is disc-shaped, but the rigid portion 430 may have different shapes in various embodiments, and the shape of rigid portion 430 as shown in FIG. 3 should not be considered limiting.

In various embodiments, flexing portion 420 will include bending insert cavity 600. Rigid portion 430 is substantially circular in the current embodiment and has a diameter D3. In various embodiments, rigid portion 430 will include stiffening insert 230. As shown in FIG. 4, it will be desirable in some embodiments to have the additional support of a reinforcement strap 450. In various embodiments, stiffening insert 230 prevents substantial or all flexing or bending of rigid portion 430. Also shown in FIG. 4 is o-ring 510. In various embodiments, o-ring 510 is incorporated into or made part of disc flapper 210 to ensure a tight seal between check valve disc 200 and disc sealing surface 184. The o-ring 510 has a diameter D4 which in various embodiments measures between diameter D1 and diameter D2 of disc sealing surface 184.

Figure 5:
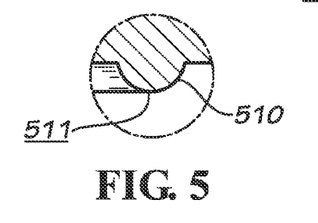
FIG. 5 is a detail view of the check valve disc of FIG. 3 identified by detail 5 in FIG. 4.

Disclosed in FIG. 5 is a detail view of the check valve disc 200 of FIG. 4 identified by detail 5 in FIG. 4. Shown is o-ring 510 with o-ring sealing surface 511. O-ring sealing surface 511 is sized to engage disc sealing surface 184 around the entire periphery of O-ring 510 to prevent fluid leakage between o-ring sealing surface 511 and disc sealing surface 184 when the check valve disc 200 is in the closed position.

Figure 6:
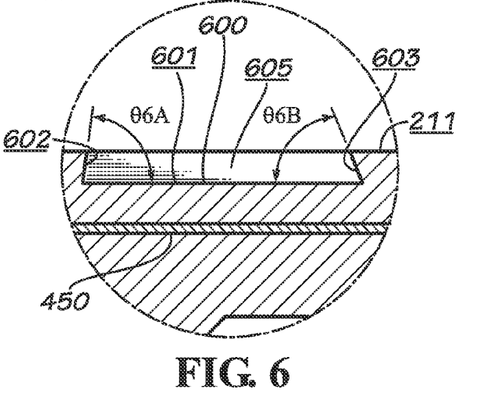
FIG. 6 is a detail view of the check valve disc of FIG. 3 identified by detail 6 in FIG. 4.

Disclosed in FIG. 6 is a detail view of the check valve disc 200 of FIG. 4 identified by detail 6 in FIG. 4. The bottom wall surface 601, the first side wall surface 602, the second side wall surface 603, the first end wall surface 604 (shown in FIG. 3), and the second end wall surface 605 define the bending insert cavity 600 with length L6, width W6, and height H6. Also shown is an angle $\theta$6A defined between the bottom wall surface 601 and the first side wall surface 602 and an angle $\theta$6B defined between the bottom wall surface 601 and the second side wall surface 603. In various embodiments, both angle $\theta$6A and angle $\theta$6B are acute angles in order to capture or retain stiffening inserts described below. The inward tilt of the first side wall surface 602 and the second side wall surface 603 towards each other at the top of each surface can also be referred to as a locking element to lock in the bending insert 700.

Disclosed is also reinforcement strap 450 of check valve disc 200. In various embodiments, reinforcement strap 450 wraps around stiffening insert 230 and hinge pin 220 and extends from stiffening insert 230 to hinge pin 220 to provide reinforcement for the material of disc flapper 210. In various embodiments, reinforcement strap 450 provides reinforcement by carrying at least some of the mechanical load—tensile load during each opening of the valve, for one example among others—that is experienced by the disc flapper 210 during operation. In various embodiments, reinforcement strap 450 is not present. In various embodiments, reinforcement strap 450 fully encloses one or both of stiffening insert 230 and hinge pin 220. In various embodiments, reinforcement strap 450 partially encloses one or both of stiffening insert 230 and hinge pin 220. In various embodiments, reinforcement strap 450 is made from a cloth such as fiberglass cloth. In various other embodiments, reinforcement strap 450 is not made from cloth but is made from another material or combination of materials with tensile strength and other properties that will result in it being able to prevent disc flapper 210 from stretching or deforming over time.

Figure 7:
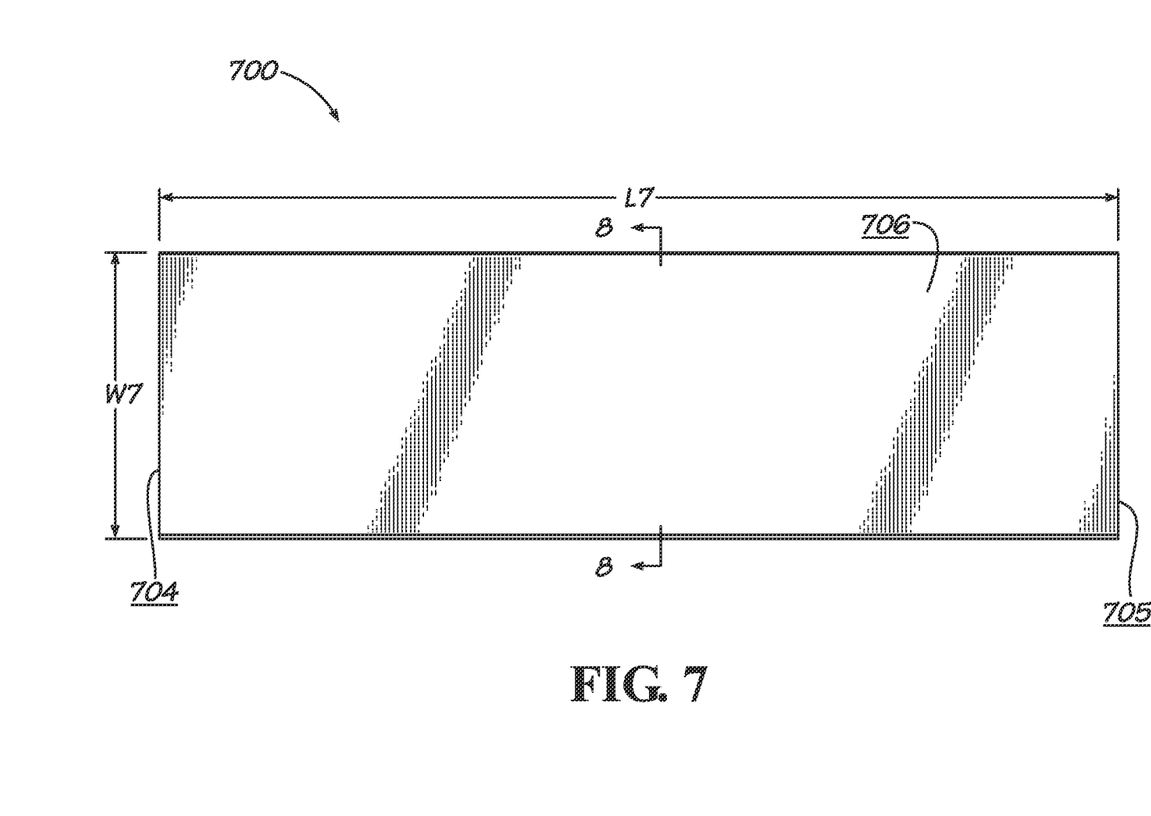
FIG. 7 is a top view of one embodiment of a bending insert of the check valve disc of FIG. 3.

Disclosed in FIG. 7 is a top view of one embodiment of a bending insert 700 for use with the check valve disc 200. Available in multiple sizes depending on the stiffness desired for optimization of check valve operation, bending insert 700 has length L7, a width W7, and a height H7 (shown in FIG. 8). Bending insert 700 includes a bottom surface 701 (shown in FIG. 8), a first side surface 702 (shown in FIG. 8), a second side surface 703 (shown in FIG. 8), a first end surface 704, a second end surface 705, and a top surface 706. In various embodiments, bending insert 700 will be sized to fit tightly in bending insert cavity 600 of check valve disc 200. However, in various embodiments it will be desirable for bending insert 700 not to fill entire bending insert cavity 600 in one or more areas and at the same time in various embodiments it will be desirable for a slight interference fit to exist between bending insert 700 and bending insert cavity 600. Having a space between bending insert 700 and bending insert cavity 600 in at least one area of interaction between bending insert 700 and bending insert cavity 600 will ease insertion of bending insert 700 in various embodiments, while having an interference fit between bending insert 700 and bending insert cavity 600 will help maintain the position of bending insert 700 in various embodiments.

The various embodiments of check valve disc 200 which include bending insert cavity 600 but not bending insert 700 will close more slowly against disc sealing surface 184 than the various embodiments of check valve disc 200 which either do not include bending insert cavity 600 or include bending insert cavity 600 but do not include bending insert 700. Check valve disc 200 with bending insert 700 having taller height H7 will close more quickly against disc sealing surface 184 than the various embodiments of check valve disc 200 which either include bending insert cavity 600 but do not include bending insert 700 or which include bending insert 700 having height H7 which is smaller. Check valve disc 200 need not include bending insert cavity 600 nor be assembled with bending insert 700, however, in order for check valve disc 200 and check valve 100 to function properly in various embodiments. In various embodiments, however, the presence of bending insert cavity 600 and various sizes of bending insert 700 provide options to an owner or end user of the check valve 100 and the system including the check valve 100, or to a service technician installing, servicing, or otherwise handling the check valve 100. The presence of bending insert cavity 600 and various sizes of bending insert 700 provides adjustability to the check valve 100 to customize and optimize its operation under various operating conditions.

Figure 8:
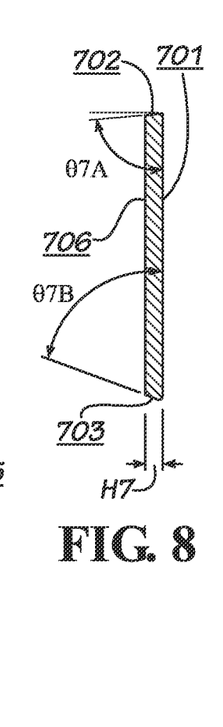
FIG. 8 is a sectional view of the bending insert of FIG. 7 taken along lines 8-8 of FIG. 7.

Disclosed in FIG. 8 is a sectional view of bending insert 700 of FIG. 7 taken along line 8-8 in FIG. 7. Shown are aforementioned height H7, bottom surface 701, first side surface 702, second side surface 703, first end surface 704, second end surface 705, and top surface 706 of bending insert 700. Also shown is an angle $\theta$7A defined between the bottom surface 701 and the first side surface 702 and an angle $\theta$7B defined between the bottom surface 701 and the second side surface 703. In various embodiments, both angle $\theta$7A and angle $\theta$7B are acute angles, between 70 degrees and 88 degrees in various embodiments and outside of the range of 70 to 88 degrees in other embodiments—in order for bending insert 700 to fit and be retained within bending insert cavity 600.

Figure 9:
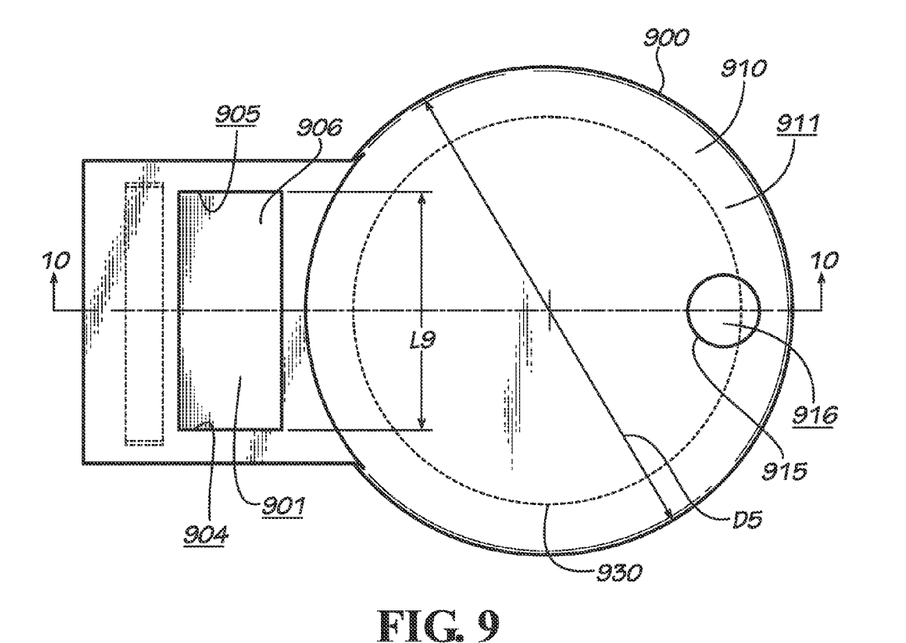
FIG. 9 is a top view of a second embodiment of a check valve disc.

Disclosed in FIG. 9 is a top view of a second embodiment of a check valve disc 900. In various embodiments, check valve disc 900 includes a disc flapper 910, which encapsulates a stiffening insert 930. In the current embodiment, no reinforcing strap is present, but reinforcing straps may be present in various other embodiments. Check valve disc 900 includes an outlet surface 911 and inlet surface 912 (shown in FIG. 10). In various embodiments, check valve disc 900 also includes a stopper 915 and a stopper surface 916. A bottom wall surface 901, a first side wall surface 902 (shown in FIG. 10), a second side wall surface 903 (shown in FIG. 10), a first end wall surface 904, and a second end wall surface 905 define a bending insert cavity 906 of the disc flapper 910 of the check valve disc 900 with a length L9, a width W9, and a height H9. Bending insert cavity 906 is sized to receive a bending insert 1100 (shown in FIG. 11). In various embodiments, both the bending insert cavity 906 and the bending insert 1100 will be substantially rectangular in shape. Check valve disc 900 need not include bending insert cavity 906 nor be assembled with bending insert 1100, however, in order for check valve disc 900 and check valve 100 to function properly in various embodiments. In various embodiments, the proportions of check valve disc 900 will cause it to be more appropriate than check valve disc 200 for use in check valve 100 for use with smaller pipe diameters.

Figure 10:
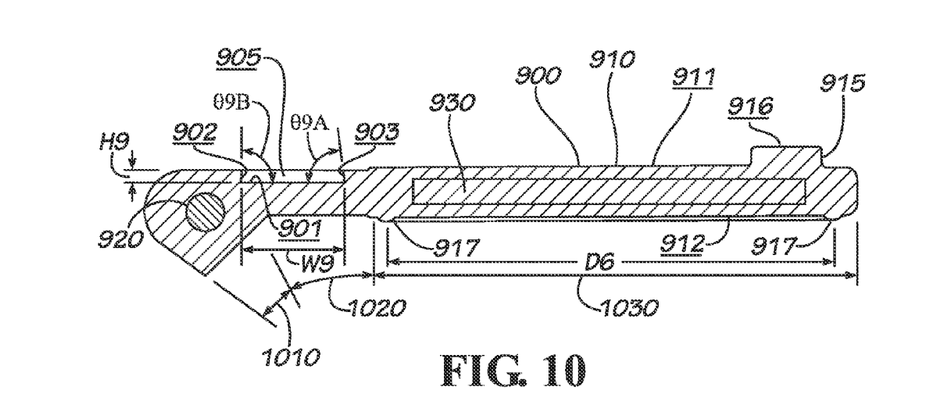
FIG. 10 is a sectional view of the check valve disc of FIG. 9 taken along lines 10-10 of FIG. 9.

Disclosed in FIG. 10 is a sectional view of the check valve disc 900 of FIG. 9 taken along lines 10-10 of FIG. 9. The check valve disc 900 includes a hinge portion 1010, a flexing portion 1020, and a rigid portion 1030. In various embodiments, hinge portion 1010 will include hinge 920. In various embodiments, hinge 920 need not allow check valve disc 900 to rotate about hinge 920 in order to be considered a hinge. In various embodiments, hinge portion 1010 of check valve disc 900 will be shaped so as to fill and remain stationary inside the space available between valve body 110 and valve cover 120.

In various embodiments, flexing portion 1020 will include bending insert cavity 906. Rigid portion 1030 is substantially circular in the current embodiment and has a diameter D5 (shown in FIG. 9). In various embodiments, rigid portion 1030 will include at least some of stiffening insert 930. In various embodiments, a portion of the stiffening insert 930 will extend into the flexing portion 1020 of check valve disc or, as in the current embodiment, will not extend into the flexing portion 1020 at all. As shown in FIG. 10, it will be desirable in some embodiments to not have the additional stiffness of a stiffening insert 930 in flexing portion 1020. In various embodiments, stiffening insert 930 prevents substantial or all flexing or bending of rigid portion 1030. In various embodiments, reduced flexing or bending of flexing portion 1020 results in a check valve 100 that closes more quickly if other factors are kept constant. Also shown in FIG. 10 is an o-ring 917. In various embodiments, o-ring 917 is incorporated into or made part of disc flapper 910 to ensure a tight seal between check valve disc 900 and disc sealing surface 184. The o-ring 917 has a diameter D6 which in various embodiments measures between diameter D1 and diameter D2 of disc sealing surface 184.

Figure 11:
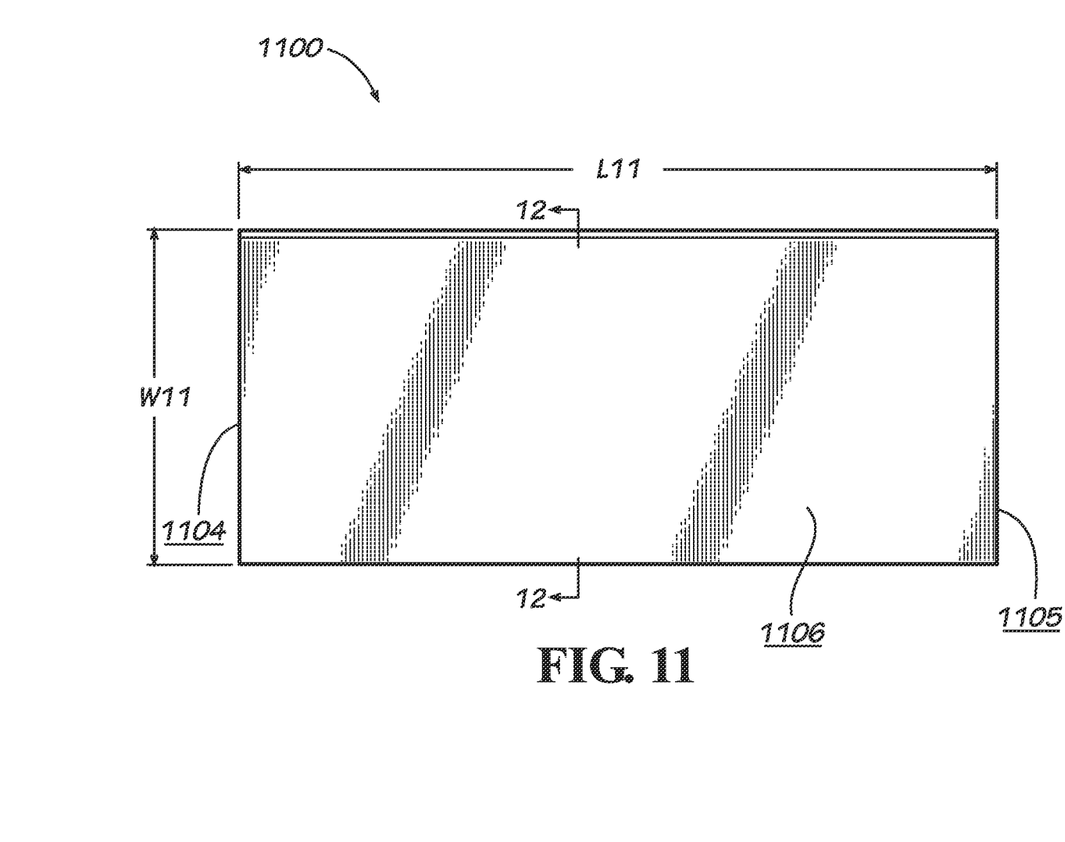
FIG. 11 is a top view of one embodiment of a bending insert of the check valve disc of FIG. 9.

Disclosed in FIG. 11 is a top view of one embodiment of a bending insert 1100 for use with the check valve disc 900 of FIG. 9. Available in multiple sizes depending on the stiffness desired for optimization of check valve operation, bending insert 1100 has length L11, a width W11, and a height H11 (shown in FIG. 12). Bending insert 1100 includes a bottom surface 1101 (shown in FIG. 12), a first side surface 1102 (shown in FIG. 12), a second side surface 1103 (shown in FIG. 12), a first end surface 1104, a second end surface 1105, and a top surface 1106. In various embodiments, bending insert 1100 will be sized to fit tightly in bending insert cavity 906 of check valve disc 900. However, in various embodiments it will be desirable for bending insert 1100 not to fill entire bending insert cavity 906 in one or more areas and at the same time in various embodiments it will be desirable for a slight interference fit to exist between bending insert 1100 and bending insert cavity 906. Having a space between bending insert 1100 and bending insert cavity 906 in at least one area of interaction between bending insert 1100 and bending insert cavity 906 will ease insertion of bending insert 1100 in various embodiments, while having an interference fit between bending insert 1100 and bending insert cavity 906 will help maintain the position of bending insert 1100 in various embodiments.

The various embodiments of check valve disc 900 which include bending insert cavity 906 but not bending insert 1100 will close more slowly against disc sealing surface 184 than the various embodiments of check valve disc 900 which either do not include bending insert cavity 906 or include bending insert cavity 906 but do not include bending insert 1100. Check valve disc 900 with bending insert 1100 having taller height H11 will close more quickly against disc sealing surface 184 than the various embodiments of check valve disc 900 which either include bending insert cavity 906 but do not include bending insert 1100 or which include bending insert 1100 having height H11 which is smaller. Check valve disc 900 need not include bending insert cavity 906 nor be assembled with bending insert 1100, however, in order for check valve disc 900 and check valve 100 to function properly in various embodiments. In various embodiments, however, the presence of bending insert cavity 906 and various sizes of bending insert 1100 provide options to an owner or end user of the check valve 100 and the system including the check valve 100, or to a service technician installing, servicing, or otherwise handling the check valve 100.

The presence of bending insert cavity 906 and various sizes of bending insert 1100 provides adjustability to the check valve 100 to customize and optimize its operation. In various embodiments, the height H7 of bending insert 700 will be less than or equal to depth H6 of bending insert cavity 600, and in various embodiments the height H11 of bending insert 1100 will be less than or equal to depth H9 of bending insert cavity 906. In various other embodiments, the height H7 of bending insert 700 will be greater than the depth H6 of bending insert cavity 600, and in various other embodiments the height H11 of bending insert 1100 will be greater than the depth H9 of bending insert cavity 906. The bottom surface 601 or the bottom surface 901 of each of the bending insert 700 or 1100, respectively, of various embodiments will have substantially the same size and shape to fit in bending insert cavity 600 and bending cavity 906, respectively, and in various embodiments the angles of each of the corresponding side and end walls relative to the bottom surface of each insert will remain constant even as the thickness or height H7 of the bending insert 700 or thickness or height H11 of 1100 changes. Using an insert with a different thickness will affect whether top surface 706 of bending insert 700 or top surface 1106 of bending insert 1100 will sit below, sit even or flush with, or sit above the top of end walls 604, 605 of bending insert cavity 600. By inserting a thinner spacer 700 or 1100, the stiffness of the bending portion 420 or 1020 of check valve disc 200 or 900, respectively, will be reduced and the check valve closing time will be increased. By inserting a thicker spacer, the stiffness of the bending portion 420 or 1020 of check valve disc 200 or 900, respectively, will be increased and the check valve closing time will be decreased. The end user is able to select which thickness H7 or H11 of bending insert 700 or 1100 will be optimal for the application.

In various embodiments, such as where it is clear under what conditions the check valve 100 is operating and what type of check valve response is needed, there will be no need for adjustment. In those embodiments of check valve 100, the desired bending insert 700 or 1100 can be inserted into the check valve disc 200 or 900 ahead of time, and even permanently attached if so desired, or it can be incorporated into the molded flapper 200 or 900 by molding the bending insert 700 or 1100 (or the material that would be become the bending insert 700 or 1100) together with the flapper 210 or 910.

Figure 12:
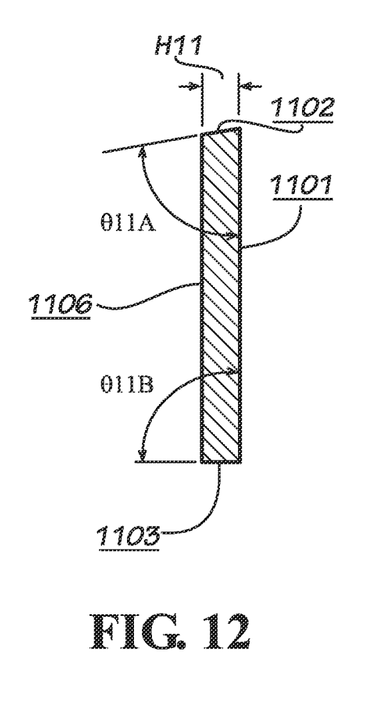
FIG. 12 is a sectional view of the bending insert of FIG. 11 taken along lines 12-12 of FIG. 11.

Disclosed in FIG. 12 is a sectional view of the bending insert of FIG. 11 taken along line 12-12 in FIG. 11. Shown are aforementioned height H11, bottom surface 1101, first side surface 1102, second side surface 1103, first end surface 1104, second end surface 1105, and top surface 1106 of bending insert 1100. Also shown is an angle θ11A defined between the bottom surface 1101 and the first side surface 1102 and an angle θ11B defined between the bottom surface 1101 and the second side surface 1103. In various embodiments, both angle θ11A and angle θ11B are acute angles in order for bending insert 1100 to fit and be retained within bending insert cavity 906. The inward tilt of the first side wall surface 902 and the second side wall surface 903 towards each other at the top of each surface can also be referred to as a locking element to lock in the bending insert 1100.

In various embodiments, disc flapper 210, disc flapper 910, bending insert 700, and bending insert 1100 are formed from urethane. In various other embodiments, disc flapper 210, disc flapper 910, bending insert 700, and bending insert 1100 are not formed from urethane but are made from another polymeric material or polymeric compound. In various embodiments, the disc flapper 210 or 910 will be made out of urethane and the bending insert 700 or 1100 will be made out of another material. In various embodiments the material of the bending insert 700 or bending insert 1100 is changed to reduce or increase the stiffness, and therefore change the check valve response, instead of or in addition to changing the thickness of the bending insert 700 or 1100.

In various embodiments, the urethane has a firm structure but is flexible enough to bend, does not absorb any substantial portion of the fluid being stored or transported in the system, has corrosion-resistance properties, is able to withstand continuous and long-term exposure to numerous types of fluids including but not limited to water, and is able to withstand a minimum of 1,000,000 check valve open and close cycles. In various other embodiments, the urethane or other material used is not be required to have all of these properties. In various embodiments, the urethane or other material used is not be required to have any of these properties, or only a portion of the part will have these properties—for example, only the exterior surfaces of the part. In various embodiments, the urethane or other material will be molded into a disc flapper 210, disc flapper 910, bending insert 700, and bending insert 1100 using a injection molding process. In various embodiments, the process will vary from injection molding.

Various materials can be used to fabricate the individual elements in various embodiments of check valve 100 and check valve disc 200. The disclosure of the specific materials or finishes or types of materials or finishes used in various embodiments, however, is not intended to be limiting of the present disclosure as other materials will be used in other embodiments of the disclosed structure and one of ordinary skill in the art would know to substitute equivalent materials where appropriate.

A method of manufacturing a check valve 100 in various embodiments involves forming a check valve disc 200 or 900 having a disc flapper 210 or 910 including urethane; and installing the check valve disc 200 or 900 between an inlet 170 and an outlet 180 of a valve body 110. In various embodiments, forming the check valve disc 200 or 900 includes forming a flexing portion 420 or 1020 of the disc flapper 210 or 910, the flexing portion 420 or 1020 having a bending insert cavity 600 or 906 sized to receive and retain a bending insert 700 or 1100, the method further including the step of placing the bending insert 700 or 1100 into the bending insert cavity 600 or 906.

In various embodiments of the aforementioned method, the disc flapper 210 or 910 will have an inlet surface 212 or 912 and an outlet surface 211 or 911, the inlet surface 212 or 912 creating a substantially fluid-tight seal with the valve body 110 when the check valve is closed, the outlet surface 211 or 911 opposite the inlet surface 212 or 912, the disc flapper 210 or 910 defining the bending insert cavity 700 or 1100 in the outlet side. There will also be various embodiments in which forming the check valve disc 200 or 900 includes encapsulating a stiffening insert within a rigid portion of the check valve disc 200 or 900 formed by the disc flapper 210 or 910.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A check valve disc comprising:
   a bending insert;
   a disc flapper;
   a flexing portion formed by the disc flapper and defining a bending insert cavity sized to receive and retain the bending insert, wherein a height defined by a thickness of the bending insert is equal to or less than a height defined by a depth of the bending insert cavity; and
   a rigid portion including a sealing surface.

2. The check valve disc of claim 1, wherein an outlet surface of the flexing portion defines the bending insert cavity.

3. The check valve disc of claim 1, further comprising a stiffening insert in the rigid portion.

4. The check valve disc of claim 3, wherein the stiffening insert is formed from metal.

5. The check valve disc of claim 3, wherein the disc flapper forms the rigid portion and the stiffening insert is fully encapsulated inside the disc flapper.

6. The check valve disc of claim 1, further comprising a hinge portion formed by the disc flapper and including a hinge.

7. The check valve disc of claim 1, wherein a one of the disc flapper and the bending insert is formed with urethane.

8. The check valve disc of claim 7, wherein the urethane is molded urethane.

9. A check valve comprising:
   a valve body, the valve body having an inlet end, an outlet end, and an inner surface defining an inlet cavity proximate the inlet end and an outlet cavity proximate the outlet end; and
   a check valve disc, the check valve disc including a disc flapper, a bending insert, and a flexing portion defining a bending insert cavity, wherein a height defined by a thickness of the bending insert is equal to or less than a height defined by a depth of the bending insert cavity.

10. The check valve of claim 9, wherein the disc flapper has an inlet surface and an outlet surface, the inlet surface creating a substantially fluid-tight seal with the valve body when the check valve is closed, the outlet surface opposite the inlet surface, the disc flapper defining the bending insert cavity in the outlet side.

11. The check valve of claim 9, wherein a height defined by the thickness of the bending insert is greater than a height defined by the depth of the bending insert cavity.

12. The check valve of claim 9, wherein the check valve disc further includes a stiffening insert.

13. The check valve of claim 9, wherein the check valve disc further includes a hinge.

14. The check valve of claim 9, wherein a one of the disc flapper and the bending insert is formed with urethane.

15. The check valve of claim 9, wherein an outlet surface of the flexing portion defines the bending insert cavity.

16. A method of manufacturing a check valve, the method comprising:
   forming a check valve disc having a disc flapper, wherein forming the check valve disc includes forming a flexing portion of the disc flapper, the flexing portion defining a bending insert cavity sized to receive and retain a bending insert, a height defined by a thickness of the bending insert equal to or less than a height defined by a depth of the bending insert cavity; and
   installing the check valve disc between an inlet and an outlet of a valve body.

17. The method of claim 16, the method further comprising placing the bending insert into the bending insert cavity.

18. The method of claim 17, wherein the disc flapper has an interior surface and an outlet surface, an inlet side creating a substantially fluid-tight seal with the valve body when the check valve is closed, the outlet surface opposite the inlet surface, the disc flapper defining the bending insert cavity in the outlet side.

19. The check valve of claim 16, wherein forming the check valve disc includes encapsulating a stiffening insert within a rigid portion of the check valve disc formed by the disc flapper.

20. The method of claim 16, wherein a one of the disc flapper and the bending insert is formed with urethane.

* * * * *